INVENTOR
CARLOS A. HORNSTEIN

BY Wenderoth, Lind & Ponack
ATTORNEYS

INVENTOR
CARLOS A. HORNSTEIN

BY Wenderoth, Lind & Ponack
ATTORNEYS

INVENTOR
CARLOS A. HORNSTEIN

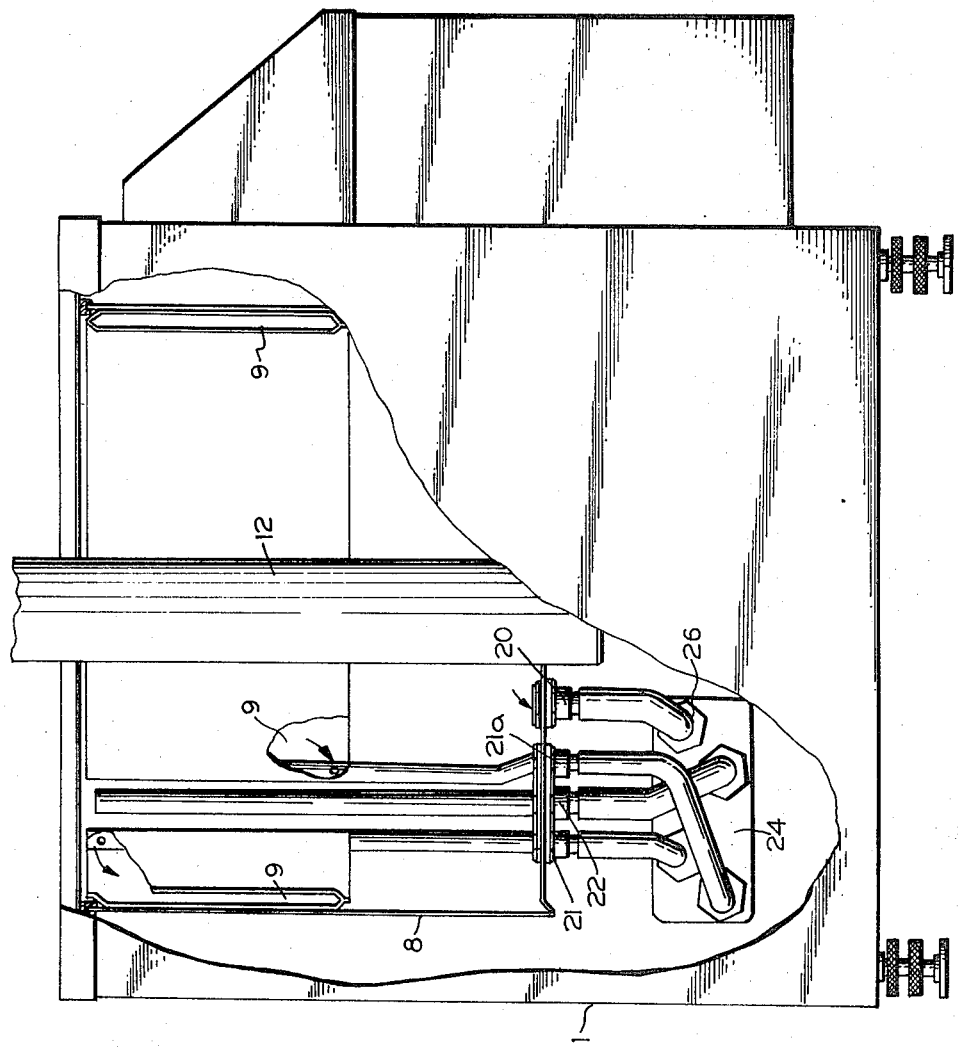

Dec. 1, 1970

C. A. HORNSTEIN 3,543,539

MACHINE FOR DYEING UNDER PRESSURE AT HIGH
TEMPERATURE OR IN OPEN BATH

Filed Dec. 16, 1968

INVENTOR
CARLOS A. HORNSTEIN

BY *Wendroth, Lind*
*& Ponack*

ATTORNEYS

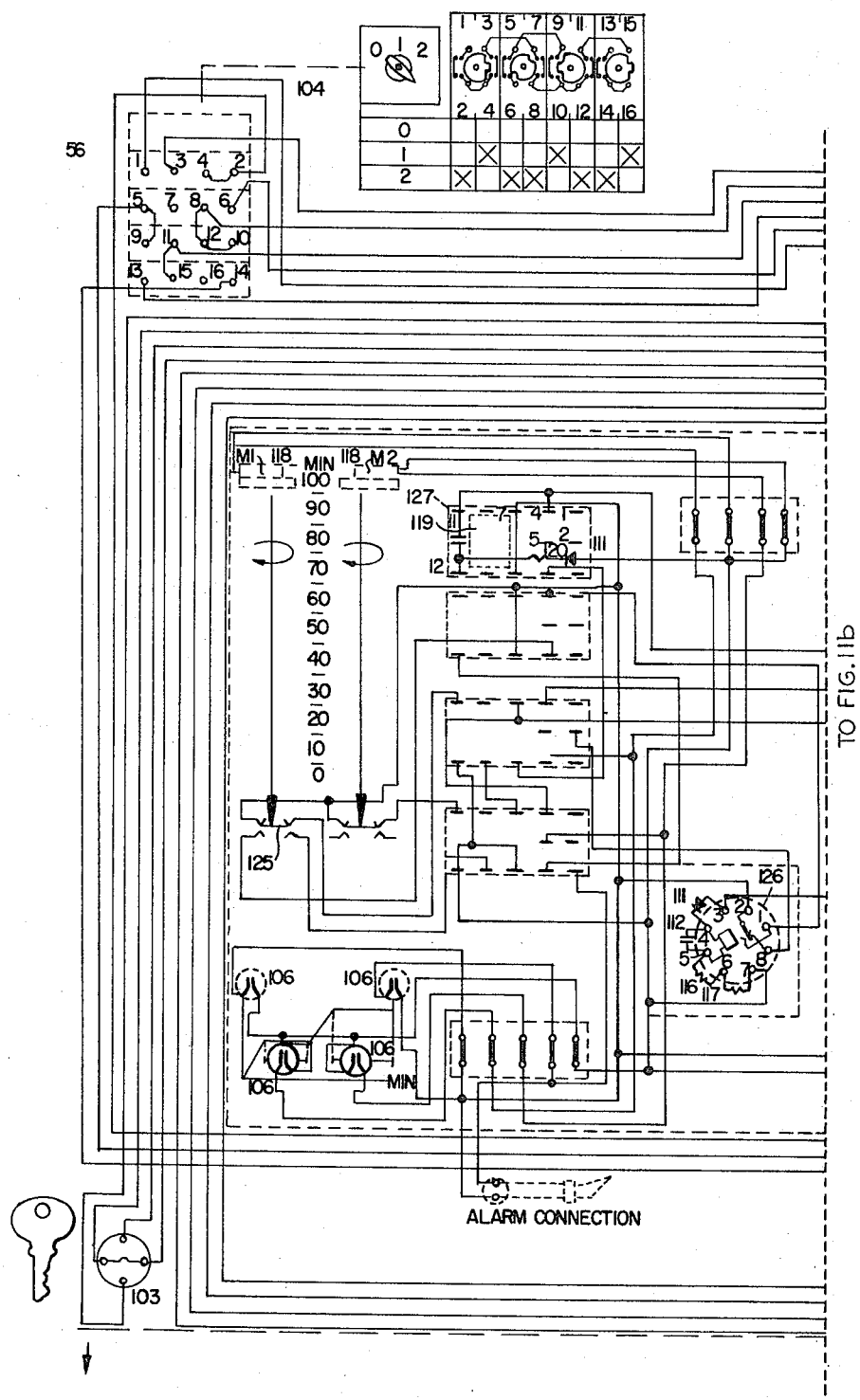
FIG. IIa
INVENTOR
CARLOS A. HORNSTEIN
BY
Wenderoth, Lind & Ponack
ATTORNEYS

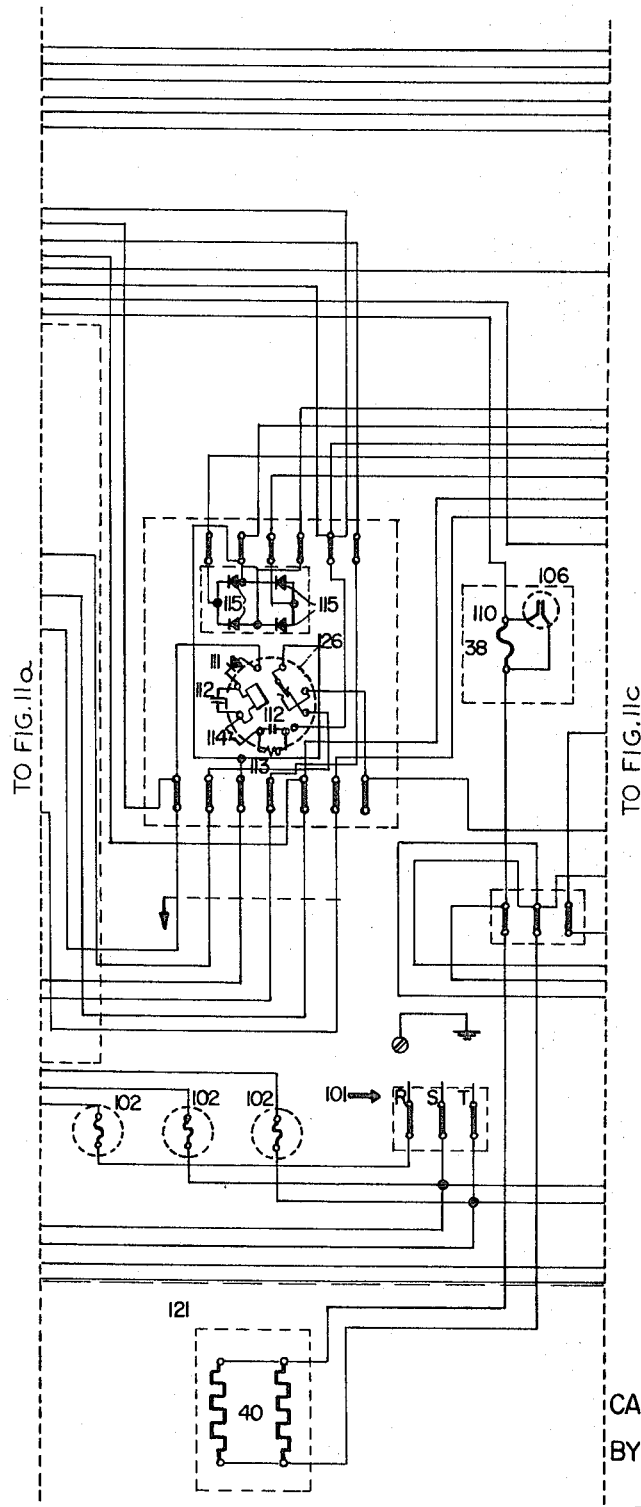
FIG.IIb

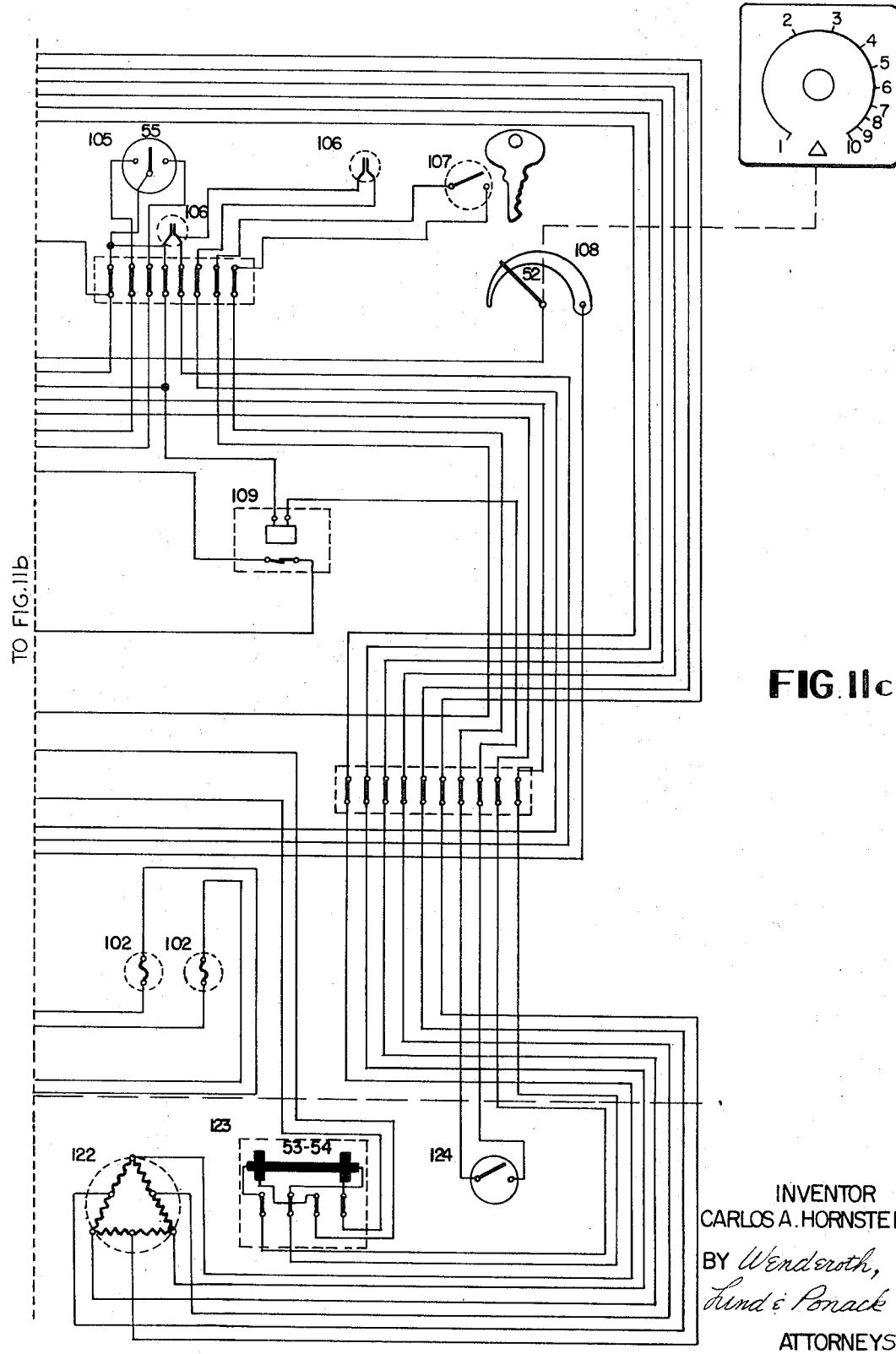

3,543,539
MACHINE FOR DYEING UNDER PRESSURE AT
HIGH TEMPERATURE OR IN OPEN BATH
Carlos A. Hornstein, Avda. Tibidabo 47,
Barcelona, Spain
Continuation-in-part of application Ser. No. 593,184,
Nov. 9, 1966. This application Dec. 16, 1968, Ser.
No. 783,957
Claims priority, application Spain, July 30, 1966,
329,730
Int. Cl. D06f 33/02, 39/04
U.S. Cl. 68—12                             8 Claims

ABSTRACT OF THE DISCLOSURE

A laboratory dyeing machine wherein a stainless steel casing contains a vat for the heating liquid. The vat is thermo insulated from the casing and has a cover wherein a plurality of dye carrier receptacles are mounted, a tubular column is centrally mounted in the vat serving as a chimney for the evacuation of vapors. Means are provided for holding textile samples which are guided by the tubular column for intermittent immersion in the receptacles. Means are provided for reciprocating the textile samples and a motor is located in the lower part of the casing for operating the reciprocating means. Electrical resistances having a thermostatic control heat the liquid and safety devices control the upper heating level. Means are provided for regulating the temperature of the liquid so as to make the temperature uniform and a time control is provided for automatically controlling the treatment cycles.

---

This application is a continuation-in-part of my application Ser. No. 593,184 filed Nov. 9, 1966 and now abandoned entitled "Machine for Dyeing Under Pressure at High Temperature or in Open Bath."

A heat resistant fluid is heated by means of electric elements and transfers the heat to the beakers introduced into said fluid, heating the solution of dyestuffs and chemicals contained in the immersed beakers.

The textile sample to be treated is inside the beaker. To provide the necessary and sufficient liquor circulation in order to give an even dyeing and penetration of the liquid into the fibers, the sample is agitated by means of an adequate mechanism.

In general, all dyeing processes tend to become more delicate and accurate controls in the machines are necessary. Furthermore, high temperature dyeing is every day more important and requires special conditions. The invention enables both high temperature and open bath dyeing of several samples, independently and simultaneously.

A further object is to enable all dyeing and finishing processes in the laboratory and the unit consists of a stainless steel housing, wherein are located all the necessary mechanisms.

A further object is to provide a cylindric tank, electrically heated, wherein the electric heating elements are at the bottom of the tank and a central, vertical chimney goes through the tank.

A still further object is to provide a construction wherein all the immersed beakers are exposed to exactly the same temperature.

A further object is to provide heating elements which are covered by a copper plate and thus the whole bottom of the tank is evenly heated over its total surface, leaving only a small part around the copper disc completely free. As soon as the copper bottom is heated by means of the heaters, the heating medium which is in direct contact with it, will circulate upwards due to temperature difference and the change in specific gravity as well as viscosity. The tank is well insulated and only the central chimney has no insulation. Therefore, this central part will always stay cooler and provide a downward flow of heating medium.

On the other hand, the free part around the copper plate allows the heated medium underneath the copper plate to flow upwards. All the parts being of circular and cylindrical shape, the flows are identical and therefore give even temperatures to all the immersed beakers, all of them vertical and with their center equidistant to the central chimney. The lower part of the machine is insulated from the bottom of the tank and only has two connections to the outside, one through a hole for pipe connection with the same diameter as the chimney, the second the chimney itself which goes vertically through the center of the tank. The temperature inside the chimney is therefore higher than the temperature inside the lower part of the machine, thus providing a steady air circulation which slightly cools the chimney and provides the above mentioned temperature difference, necessary for the heating fluid circulation. This new principle needs no mechanical agitation or stirring of the heating medium and as a result of it exposes all beakers to identical temperature.

The chimney and connection to the outside of the lower part of the machine have another most important object. If a turboblower is connected to the lower part of the machine, the air circulation will be reversed. The turboblower builds up a slight vacuum inside the lower part of the machine and the necessary air, to compensate the vacuum, will enter through the chimney. The cooling of the chimney is thus also provided by means of the forced circulation. However, the main importance of this system is the vapor and steam evacuation, both from the beakers (dye solution with chemicals) and from the heating medium.

The cited innovations and improvements objects are characterized by the immersion of the samples in receptacles that hold the dyes, mounted on the cover of a stainless steel vat that holds a heating liquid (preferably polyethyleneglycol or glycerin), and is provided with a thermoinsulating dressing contained in an exterior stainless steel armouring arranged on adjustable feet, there being in the center of said vat a tubular column of stainless steel welded to the bottom of said vat or boiler serving as a chimney for the evacuation of the vapors and for the protection of the operating mechanism coupled to the motor device housed in the lower part of the armouring, which mechanisms transmit the driving movement to the sample supports, the heater liquid being heated by means of variable power electric resistances housed in the bottom of the vat with thermostatic control, while means are provided for heating security, temperature regulation of the heater liquid, the cooling of said liquid, straight line temperature regulation and time control means with the object of automatizing the cycle or the dyeing operation cycles.

With the above and other objects in view which will become apparent from the detailed description below, a preferred modification of the invention is shown in the drawings in which:

FIG. 7 is a side view of the central column turned 90° relative to FIG. 1 of the present application.

Figure 1:
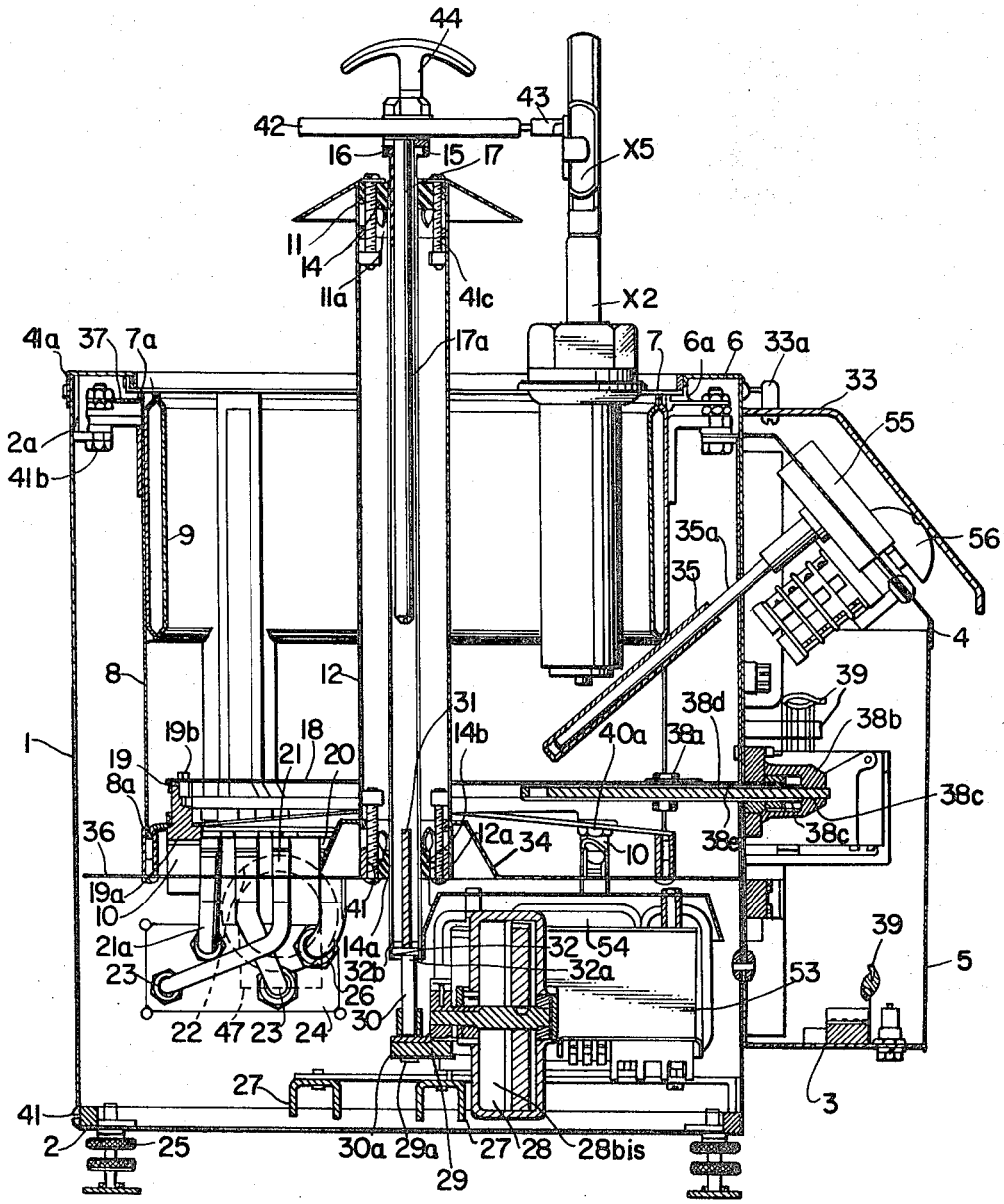
FIG. 1 represents an elevation in diametrical cross-section of the control desk with the whole apparatus.
Figure 2:
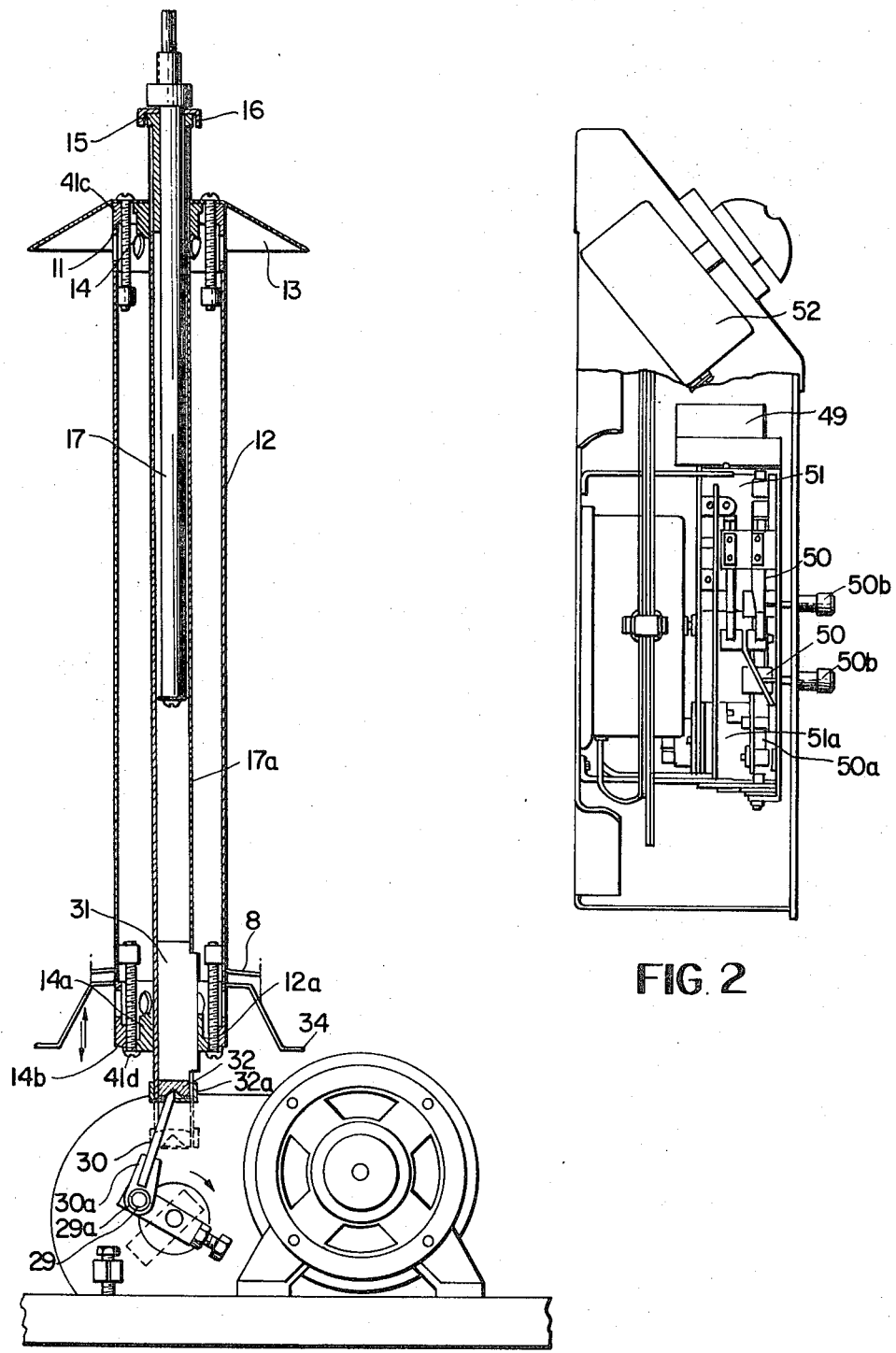
FIG. 2 shows details of the program former according to the invention.
Figure 3:
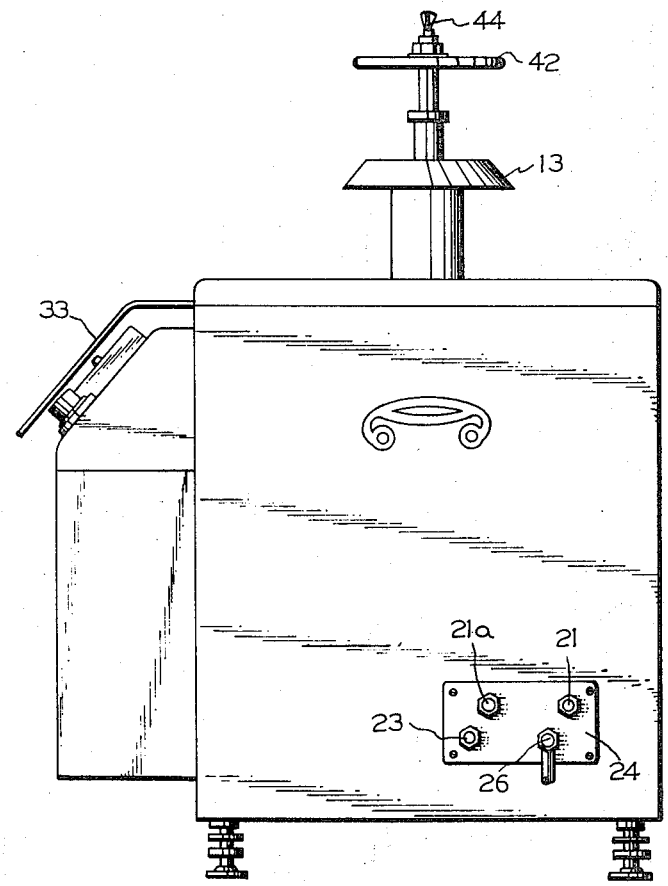
FIG. 3 is a side view of the machine.
Figure 4:
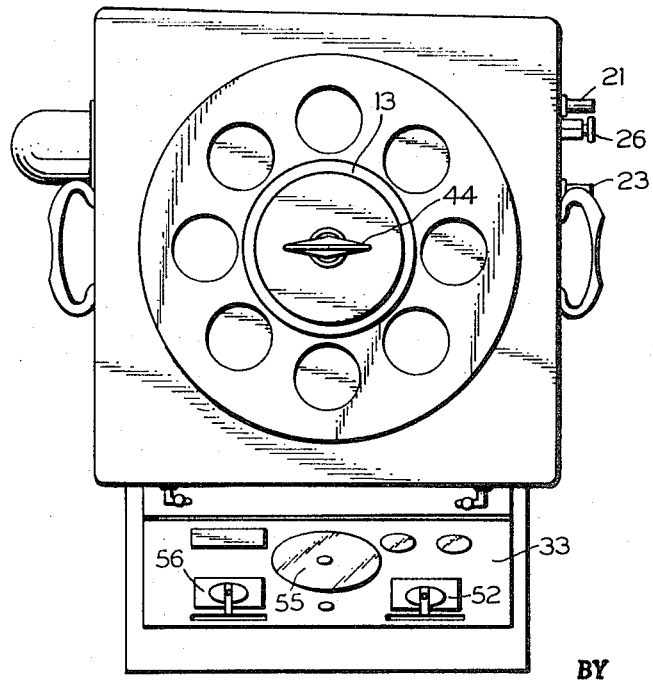
FIG. 4 is a top plan view.
Figure 5:
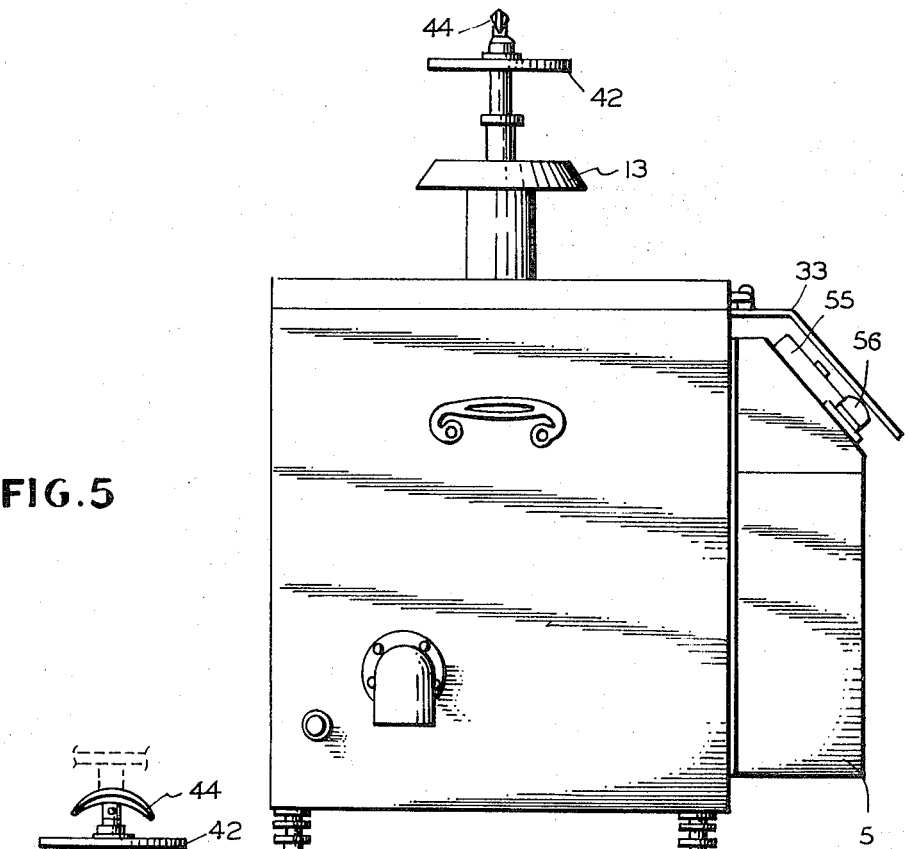
FIG. 5 is a side view from the other side of FIG. 3.
Figure 6:
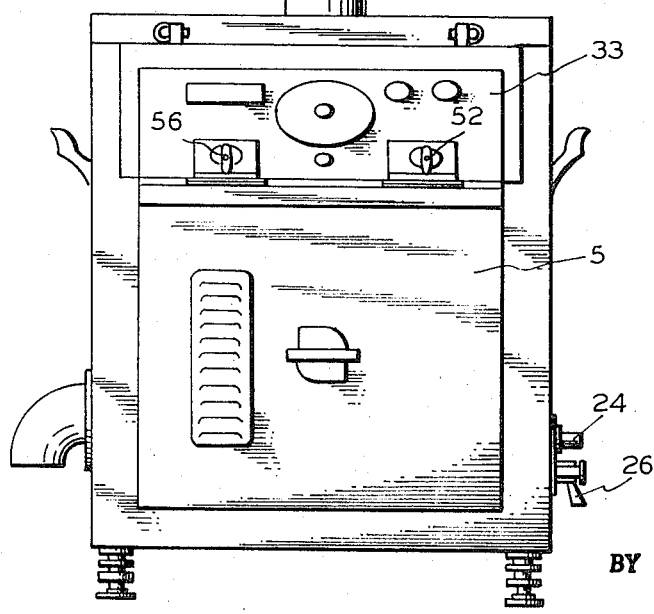
FIG. 6 is a front view.

FIG. 8 is an enlarged view showing particularly the discharge tubes 22 and the charging tube 20 for the vat 8. This view also shows the cooling jacket 9 with the entrance tubes 21 and the outlet tubes 21a.

Figure 9:
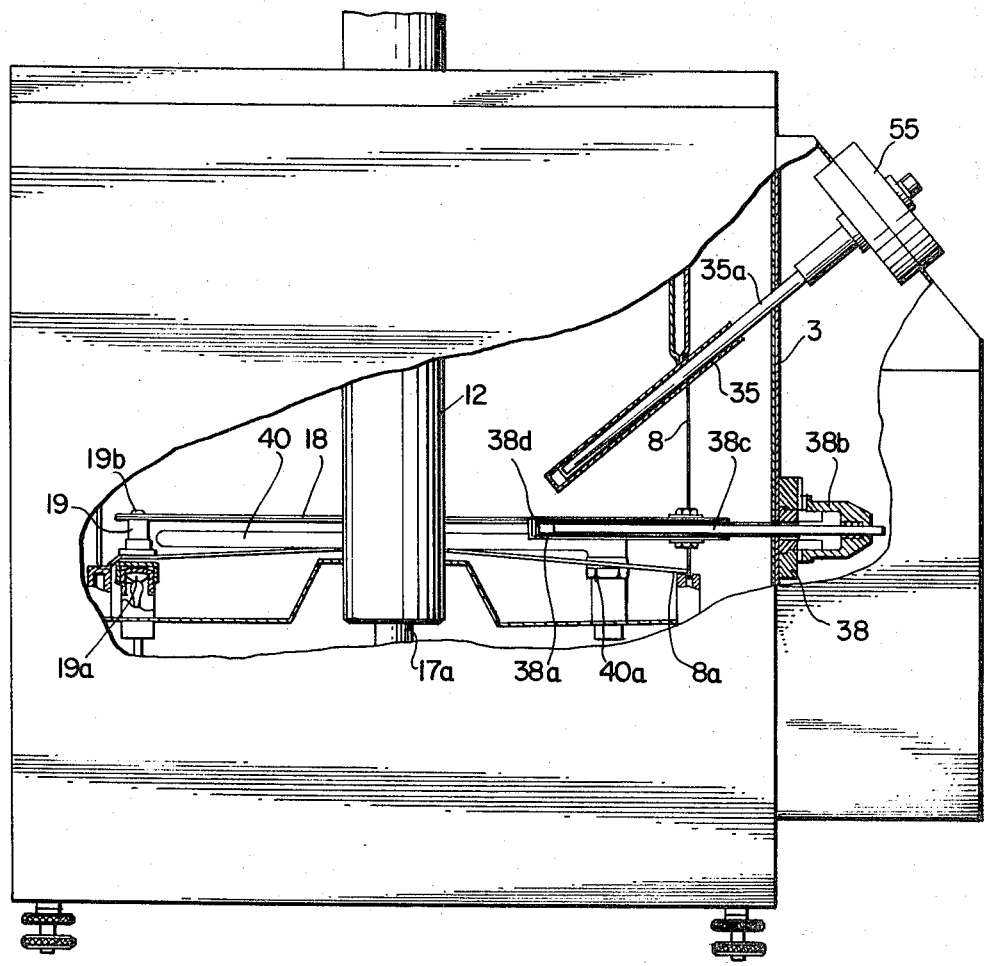

FIG. 9 is a side view of the machine with parts broken away showing the controlling elements and the security elements such as the thermostat 55, the element 19a and the fuse 38.

Figure 10:
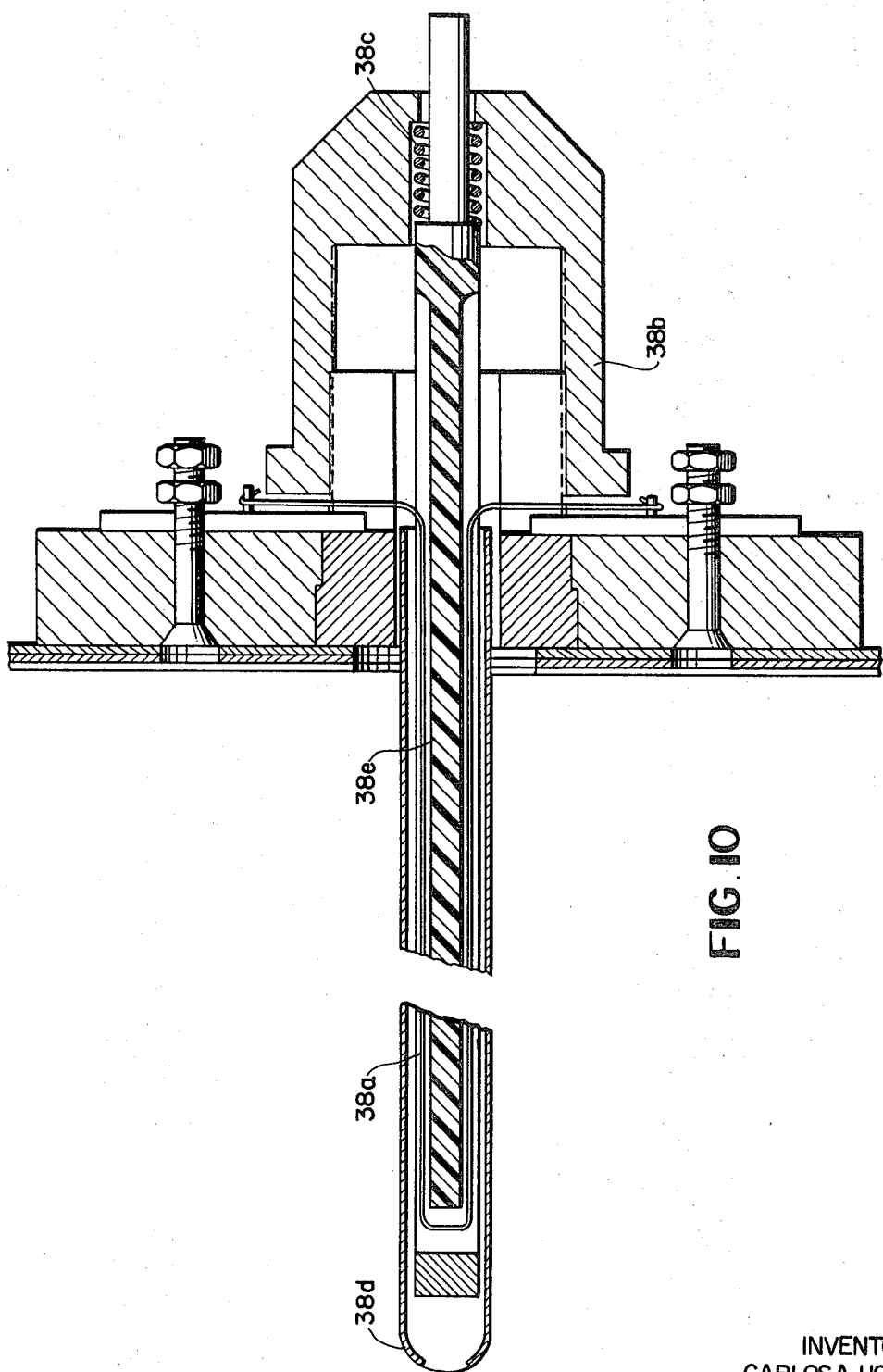

FIG. 10 is a sectional side view of the thermic fuse.

FIGS. 11a, 11b and 11c show a schematic electrical diagram of the circuits connecting the various elements.

The apparatus consists of an exterior armouring 1 of stainless steel mounted on a frame 2 by means of screws 41, the four corners of the frame having adjustable feet 25 for levelling purposes; a plate 3 fixed to the armouring 1 for holding the supports 39 for wiring and other electrical parts, as also a stainless steel control desk 4, and a stainless steel frontal part that is easily demounted for protection of all the electrical installation; a cover comprising a piece 6 as a frame joined to the armouring 1 by means of the screws 41a and of another piece 7 provided with a variable number of orifices for application to the recipients $x2$ for the dyes; said pieces 6 and 7 are coupled together by means of elastic gaskets 6a which allow the free dilation of said pieces due to heat effects, in addition to serving as thermal insulator. The armouring also is provided with handles to facilitate handling.

The armouring 1 contains a vat or boiler 8 in stainless steel, hanging from and fixed to the upper frame 2a by means of screws 41b, insulating washers, and has a capacity of about 18 litres of heating liquid, preferentially polyethyleneglycol or glycerin. An elastic gasket 7a between the boiler and the piece 7 of the upper cover, allows free dilation and provides impreviousness. A thermal insulator such as glass fibre i provided between the armouring and the boiler, 1 and 8, held between the inner plate 36 and the upper plate 37, which plates are fixed by the special nuts 8a and the screws 41b respectively, as also by a sheet cone 34. The boiler 8 has a stainless steel chamber 9 in the upper part of its interior with inlet 21 and outlet 21a tubes that pass through the bottom of the boiler and are joined to the tubes 23 fixed to the armouring 1 by means of the plaque 24 by means of non-rigid special hose pipes. The boiler is emptied through the conduit 20 joined by flexible hose pipe to the exterior cock 26 fixed to the plaque 24. An overflow 22 passing through the bottom of the boiler carries the surplus liquid from same to the exterior of the machine through the tube 23 fixed in the plaque 24.

A stainless steel tubular column 12 in chimney form is welded to the bottom of the boiler 8, passes through the upper cover 7 and is provided with a cowl 13 in stainless steel of conical form. The chimney 12 is located on the geometrical axis of the boiler 8, and the cowl 13 is fixed by the screws 41c that pass through the bearing journal piece 11 of stainless steel fixing same to the chimney. The bearing journal piece 11 has two orifices for the passage of the vapors from the bain-Marie collected by the cowl 13 and drawn through the chimney 12 and the orifices of the bearing journal piece 12a as also through the elbow 47 fixed to the armouring 1 by an extractor that is coupled to said elbow 47. The bearing journal piece 12a and the washer 14b that hold the bearing 14a are fixed to the chimney 12 by means of the screws 41d; the piece 12a also holds the sheet cone 34 in position.

The self-lubricating bearings 14 and 14a, preferably of "Teflon" with graphite loading serve as guides for the cylindrical tubular shaft 17a. The lower bearing 14a has a slot in which slides the key 31 with reciprocating movemet fixed to the shaft 17a preventing its angular movement. The upper part of the shaft 17a carries a threaded piece 15. The piece 16 screwed on to the piece 15 allows the extensible shaft 17 to be blocked in the raised position by means of a notch in the key of said shaft 17. The circular plate 42 mounted on the upper extremity of the shaft 17 is provided with radial arms 43 fixed to said plate 42. The arms 43 have a fastening device for the material-carrier hooks or for the magnet-carriers $x5$. This device consists of a blocking piece activated by a spring that considerably facilitates the operation of placing or removing the material carrier. The handle 44 allows the extension of the shaft 17 and in consequence the immersion in the recipients containing the dye.

The shaft 17a transmits the up-and-down movement to the plate 42 and in consequence to the material-carriers or to the magnets fixed on the radial arms 43, producing a perfect agitation of the material in the interior of the recipients.

The shaft 17a is moved by an electric motor in the lower part of the apparatus, and the motor runs at two speeds, controlled by the switch 56 and transmits its rotary movement to a reduction gear 28 housed in the cast aluminium housing 28bis. The high speed of the motor is reduced through helical and spur gearing contained in said housing 28bis, by which means efficiency is increased and the available power in the shaft 17a is augmented. The slow movement of the crank 29 united to the reduction gear 28 transmits the reciprocating movement to the shaft 17a through the piece 30 in the form of a connecting rod, the two pieces 29 and 30 being united by a self-lubricating bearing 29a and the bearing journal piece 30a. The piece 30 terminates in knife form that is supported on the self-aligning piece 32 avoiding wear and rendering lubrication unnecessary. Said piece 32 is in turn supported on the key 31 and the whole assembly of pieces 30, 31 and 32 are fixed to the shaft 17a by means of a special nut 32a screwed to said shaft 17a at its lower extremity.

The heating of the bain-Marie is obtained by two resistances 40 situated in the bottom of the boiler concentrically around the central chimney. The power of said resistences may vary within certain limits, in this case being 2600 watts. The electric resistences 40 pass through the bottom of and are fixed to the boiler 8 by means of nuts 40a and the insertion of the corresponding gaskets. Two superimposed copper discs 18 are localized above the resistances 40 and cover the whole of the bottom of the boiler 8 to which they are fixed by a screw 19b and a piece of copper 19 that passes through the bottom of the boiler 8 to which it is fixed by means of a nut with the interposition of an adequate gasket.

The straight-line-curve temperature regulation is realized by means of an iron core reactance 53 which may be saturated at will by means of a bobbin 54 excited by rectified current and regulated by means of a rheostat 52. The reactance inserted in series with the heating resistences 40 allows the impedance of the system to be varied, and in consequence the active power of the heating.

The thermostat 55 permits control of the temperature. It has two contacts which connect and disconnect the heating resistances through relays and contactor and thus place the programizer mechanisms in operation. The rod 35a passes through the sheet 3, the thermal insulation and the boiler wall 8 wherein it enters and is protected by a covering 35 of conducting material welded to the boiler 8. Said thermostat is provided with a limit to prevent the temperature from rising above the fixed limit, in this case 150° C.

The limiting thermostat 19a is housed in the copper piece 19 previously mentioned and consists of a bi-lamina contact that disconnects the current from the resistances should the temperature rise above the limit, in this case 160° C., and connects again when the temperature descends.

The fuse 38 fitted to sheet 3, passes through same, the thermal insulation and the boiler wall 8 to penetrate into the interior of the boiler, and is protected by a covering 38d of insulating material and by another covering 38a of conducting material, fixed to the boiler 8 by a flange union with its corresponding gaskets, the fuse being composed of a metal alloy of low melting point, in this case 180° C. connected in series with the electric circuit of the machine, and mounted on the rod 38e of insulating material ("Teflon") with slots for receiving the conducting wire; said rod is introduced within the covering 38d and is fixed to the support by means of the piece 38b of threaded insulating material. The spring 38c presses on the rod and in consequence on to the conducting wire. If the temperature passes the limit, said wire fuses and the spring separates the two fused extremities thus preventing the melted metal from making contact.

The time is controlled by two synchronous motors 49 which transmit their movement to two rods of endless screw form 50a. Two devices 50 traversed by two rods 50a move along these latter owing to a steel wire that forms a gearing with the endless screw. Said pieces 50 may be slid at will on the rods 50a by actuating on the controls 50b. Within a determined time depending on the rotary speed of the rod and on the pitch of the endless screw, the pieces 50 travel over a certain space; levers are located at the lower extremity of the stroke which actuate a series of contacts; these contacts by means of the relays 51 realize the programmed cycle, and indicate the end of a process by means of luminous and acoustic signals.

The machine is provided with the corresponding pilot lamps, fuses and adequate controls for its easy operation. A plastic cover on hinges 33a protects the control desk 4.

The upper part of the chimney which is outside the machine at a certain height over the cover of the machine, is provided with a slightly conical plate, having a superior diameter than the chimney. This plate covers the upper end of the chimney and leaves open only four holes located in the chimney-wall directly underneath the plate. The air flow is therefore directed by the inverted cone and enters into the chimney from all around in an upward direction. The beakers being around the chimney and their upper end just underneath the cone, all vapors coming from them will be absorbed by the airflow and directed through the chimney and the lower part of the machine into the exhaust system. If one of the receptacle holes of the cover of the machine is free (without introduced beaker), the vapors of the heating medium will be eliminated in the same way.

The heating medium and its vapors will heat up the cover of the machine. To avoid deformation of said cover through expansion by temperature increase, the cover has been designed in two parts so that the part with receptacle holes which entirely covers the tank is held in place through special rubber joints. One rubber joint holds the plate to the chimney, a second joint is between said plate and the tank and the third joint is between the plate and the cover frame. The plate is therefore completely free. Furthermore, the joints actuate as thermal insulation and the cover frame never becomes warm enough to burn and be harmful. Another advantage is that the plate is at a slightly lower level than the cover frame and any liquid or heating fluid will flow back into the tank without reaching the cover frame.

Many textile dyeing processes require a cooling of the liquor after having been working at the boil or higher.

The machine is provided with a cooling jacket inside the tank, around the upper ⅔ of the tank wall. The jacket is connected through the bottom of the tank to a water inlet and outlet for the water circulation. The position of the jacket is most important, for as soon as the water circulates, the cooled heating medium in direct contact with the jacket starts flowing downwards (change in specific gravity and viscosity), producing a circulation of the heating medium which thus is evenly cooled to the required temperature. The jacket has a smaller perimeter than the tank and the circumference is not closed. Both ends of the circumference are welded to the water inlet and outlet respectively. This allows the jacket to expand or contract freely due to temperature changes. The originated slight movement will prevent depositions on the inner walls of the jacket when working with hard water.

The electric motor actuates upon the central vertical shaft of the machine. Said shaft goes through the central chimney and at both ends of the chimney are located two self-lubricating bearings. A second shaft fits into the mentioned main shaft through the upper part and by means of a turning set-screw is adjusted at the desired height. This device enables to lift or lower the second shaft, which at its upper end has affixed a plate with radial arms. Therefore, the material holders with the samples can simultaneously be immersed into the different beakers and dyeing solutions. The arms of the plate have a self-adjusting locking device to hold the material holders or magnetic systems (high temperature test), providing a fast and simple operation.

The lower part of the main central shaft is connected to a special transmission which needs no lubrication. The transmission piece has the shape of a knife and works with the least possible friction in a small self-adjusting piece. Said piece corrects its position automatically if, by any means, the central shaft is brought out of its vertical position.

The motor transmits its high speed over several gears to the low speed of the transmission, gaining power and avoiding wearing out of the gears. The gears are all of different material, a very important fact to reduce noises to a minimum. All of the gears are located in a sealed gearbox affixed directly to the motor. It therefore needs no maintenance. The motor has two speeds which are reduced to the best immersion speeds for the dyeing processes.

It is important to adjust the heating rate (rate of temperature rise) in accordance with the specific exhaust-curve of the dyestuff. The stepless heating rate control works in a simple and effective manner.

The AC current is transformed into DC through a rectifier. The rectified current is regulated by means of a rheostat and actuates the bobbin of a variable reactance. Depending on the current going through the bobbin, the reactance will be more or less saturated, varying therefore the amount of alternating current going through the two outer bobbins of the reactance. The heating elements receive therefore a variable and adjustable alternating current and the heating intensity will proportionally change from low to high, depending on the chosen position on the above mentioned rheostat.

It is most important to select a certain temperature of the dye bath and to maintain this temperature accurately for a given time, depending directly on the process. After said time, a higher temperature must be reached and maintained for a different time. All these factors must be independently variable.

The invention has a built-in thermostat to control the preset temperatures. Said thermostat is adjusted to allow accurate dye bath temperature control and maintain automatically the two selected temperatures with the slightest possible variations. The contacts on the thermostat needles actuate a series of relays, divided into two main circuits, one for the first temperature and the second for the second temperature. A secondary circuit connects and disconnects automatically the heating through a contactor. The two circuits are connected to the circuits of the programming unit where the before mentioned times are preset for each temperature. During the process, and at any time, the situation can be controlled visually for all indicators change their position while time is going by. The timing device consists of two motors actuating upon a threaded axis (one per motor), as the axis turns slowly, the thread moves a piece along its whole length until it comes to the end where a micro-contact is actuated by said piece, stopping the motor. A device on the mentioned piece allows to disengage it from the thread and move it freely along the threaded axis in order to position it indicating the selected time on the parallel time scale. A diagram with neon lights is connected to the circuit and indicates all the steps of the program.

The laboratory dyeing machine enables a complete automatic work with built in accurate control elements and programming. It is a fact that thermostats, heating elements, motors and gearbox, special transmissions, rheostats and reactance, relays and timers are well known elements. However, all these elements had to be specially designed and built to achieve the purpose with all the above mentioned characteristics. Also the machine enables both high temperature and open bath laboratory tests on any type of textile samples.

The maneuvering mechanism comprises a reduction gear housed in a crankcase with transmission gearing driving a connecting rod coupled to a self-centering piece joined to a central shaft which is protected by the tubular column and guided by two "Teflon" bearings with graphite loading.

The temperature limiting security means comprise: a mechanical limit situated in the regulating thermostat scale in this case fixed at 150° C.; a two finger contact that opens the circuit upon reaching a certain temperature, in this case 160° C. and closes again when the temperature falls below 150° C., this device being housed in a copper thermal conducting support that passes through the bottom of the boiler to enter into direct contact with the thermal diaphragm, thus securing high precision in the disconnection of the current; a fuse wire of low melting point, in this case a 180° C. fusible alloy inserted in the electric circuit applied to the boiler with a protective covering and mounted on an adequate material, in this case "Teflon," which fuse blows and opens the electric circuit when the determined maximum temperature has been reached.

The heater liquid temperature regulating means consists of discs of conducting material, in this case copper, situated in the bottom of the vat and in contact with the electric resistences.

The heater liquid cooling means consist of a chamber housed in the upper part of the vat in direct contact with said liquid with the object of activating the cooling of same, and to avoid excessive deposits of calcareous salts, in addition to assisting in the regulation of the cooling time.

The temperature straight-line control means comprise an iron core reactance that may be saturated at will by means of a bobbin excited with rectified current and regulated by means of a rheostat. Said reactance is connected in series with the heating resistances, thus allowing the impedance of the system to be varied, and in consequence the heating active power.

The time control means is the scheduled cycle consist of timers with the corresponding contacts and relays coupled to the feeding system of the heating assembly.

The control of desired temperatures is obtained by means of a thermostat with adjustable electric contacts. This apparatus is fitted so that the active part passes through the thermal insulating covering of the boiler, through the wall of this latter and penetrates into the interior of same, being protected by a covering of conducting material; the visible part of the device, or the temperature indicating dial and the regulation controls are situated on the exterior surface of the control desk of the apparatus.

The upper cover of the apparatus consists of two pieces, one of which is fitted to the armouring, while the other is provided with orifices for the introduction of the dye carrier recipients with the intercalation of elastic gaskets for hermetic closing and the absorption of distensions due to dilations of the metallic parts.

FIGS. 11a, 11b and 11c illustrate a schematic electrical diagram showing the circuits for operating the various elements set forth above. In such figures relays are indicated at 126 and 127. A micro-interrupter switch is shown at 125 and a thermostat at 124. A variable reactor is shown at 123 and a 2 and 4 pole motor is shown at 122. A heating element is indicated at 121 and a resistance at 120. A condenser is shown at 119 and a synchronous motor at 118. Resistances are indicated at 113, 114, 116 and 117. A silicon rectifier is indicated at 115 and 111. A condenser is shown at 112 and a fuse at 110. A contact is shown at 109 and a heating rate control variable resistance at 108. At 107 an interruptor switch is indicated with a key for the heating control.

A neon lamp is shown at 106 and a thermometer-thermostat for temperature control up to 150° C. is indicated at 105. At 104 an interrupter switch for the motor control is indicated and at 103 a commutator with key for manual operation or automatic work. A fuse is shown at 102 and a three-phase RST alternating current is indicated at 101.

I claim:

1. A laboratory dyeing machine for operating under pressure at a high temperature or in an open bath comprising a stainless steel casing having adjustable feet, a vat containing a heating liquid located within said casing thermo insulated from said casing, a cover for said vat, a plurality of dye carrier receptacles mounted in said cover for intermittent immersion of textile samples, a tubular column centrally mounted in said vat serving as a chimney for the evacuation of vapors, means for holding textile samples guided by said tubular column, means for reciprocating said means for holding textile samples, a motor located in the lower part of said casing for operating said reciprocating means, means for collecting and expelling the vapors, electric resistances having a thermostatic control for heating the heater liquid, safety devices controlling the upper heating level, means for regulating the temperature of the heater liquid, means for cooling said liquid, means for uniformly regulating the temperature, and a time control for rendering the treatment cycles automatic.

2. A machine as set forth in claim 1 wherein said means for reciprocating comprises a reduction gear housed in a carter with a gear transmission for driving a connecting od coupled to a self-aligning piece that is joined to a shaft housed in said central tubular column.

3. A machine as set forth in claim 1, wherein said safety devices comprise a fuse wire of low melting point metallic alloy applied to the vat under a protecting cover, so that when the upper limiting temperature is reached said wire fuses and disconnects the electric current; and by a limiting thermostat coupled to a conducting support that passes through the bottom of the vat and enters into direct contact with said liquid.

4. A machine as set forth in claim 1 wherein means for regulating the temperature of the heater liquid comprises discs situated in the bottom of the vat and in contact with said electric resistances.

5. A machine as set forth in claim 1 wherein said means for cooling said liquid comprises a chamber situated in the upper part of said vat in direct contact with the liquid to avoid excessive deposits of calcareous salts.

6. A machine as set forth in claim 1 wherein said means for maintaining said temperature uniform comprises a continuous current rheostat that actuates a reactance with saturated core.

7. A machine as set forth in claim 1 wherein said time control comprises a plurality of timers with contacts and a relay circuit that controls the operation in accordance with a predetermined program.

8. A machine as set forth in claim 1 wherein said cover comprises two pieces, one of which is fitted to the armouring in the form of a frame, while the remainder is provided with orifices for the introduction of said receptacles for the samples, with the intercalation of elastic gaskets for hermetic closing and for the absorption of distensions due to dilations of the metallic parts.

References Cited
UNITED STATES PATENTS 2,901,902  9/1959  Horsfall _____ 68—170

WILLIAM I. PRICE, Primary Examiner

U.S. Cl. X.R.

68—15, 170